B. REDLICH.
CARBON ELECTRODE FOR ELECTRIC FURNACES.
APPLICATION FILED FEB. 19, 1912.
1,048,581.
Patented Dec. 31, 1912.
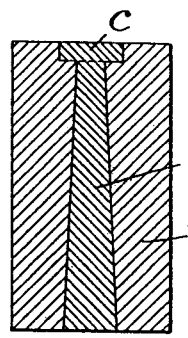
Fig. 1.
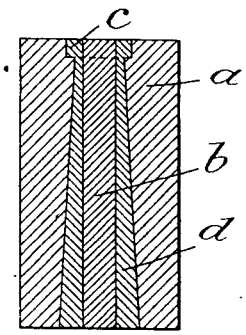
Fig. 2.
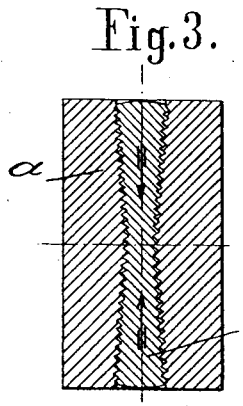
Fig. 3.
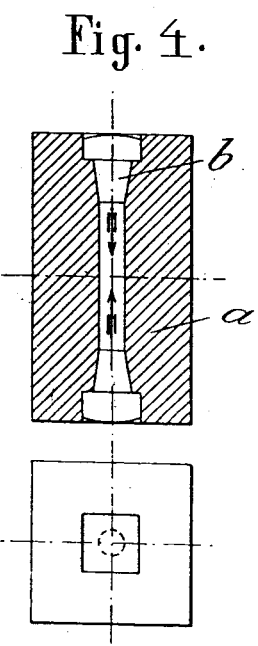
Fig. 4.
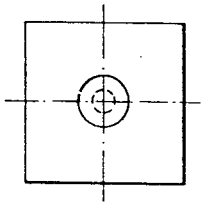
Fig. 6.
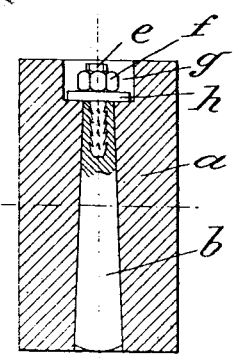
Fig. 5.
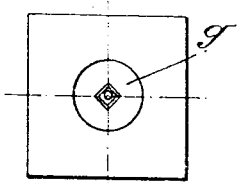
Witnesses—
Inventor
Berthold Redlich
by
Attorney.

UNITED STATES PATENT OFFICE.

BERTHOLD REDLICH, OF RATIBOR, GERMANY, ASSIGNOR TO THE FIRM OF PLANIA-WERKE AKTIENGESELLSCHAFT FÜR KÖHLENFABRIKATION, OF RATIBOR, GERMANY.

CARBON ELECTRODE FOR ELECTRIC FURNACES.

1,048,581.            Specification of Letters Patent.      Patented Dec. 31, 1912.

Application filed February 19, 1912. Serial No. 678,603.

*To all whom it may concern:*

Be it known that I, BERTHOLD REDLICH, subject of the Emperor of Austria-Hungary, residing at Ratibor, Upper Silesia, Germany, doctor of chemistry, have invented certain new and useful Improvements in Carbon Electrodes for Electric Furnaces, of which the following is a specification.

The carbon electrodes in which metal cores which offer a considerably reduced electrical resistance are embedded offer various difficulties in their production. If the metal core is inserted into the carbon electrode before burning, the metal, especially iron, absorbs carbon during the burning process and thus becomes brittle, so that its mechanical durability, which is of importance when it is in use is influenced. If the core is inserted into the hollow spaces or recesses, provided in the electrode, after burning the production of a sufficiently secure contact on the employment of very simple and marketable cross sections, offers difficulties. Experiments have proved that a good contact between the metal core and the electrode is obtained by casting molten metal or metal alloys into the hollow spaces provided in the electrode. If, in this manner great advantages are obtained, difficulties are still met with, as the metal contracts on solidification and the carbon retains its shape, so that the metal core after solidification may be separated from the electrode by a thin air space thus producing a bad contact between the metal core and the carbon electrode. This disadvantage can be avoided by providing the metal core and the bore in the carbon of a corresponding form and employing the property of the solidifying metal or metal alloys, which contract to a high degree, for the purpose of effecting a firm pressing of the metal core against the electrode wall. The form of the metal core can also be so chosen that, after casting it can be made to fit accurately into the form of the hollow space by suitable mechanical auxiliary means.

In the drawing are shown a few constructional forms of the improvement.

Figure 1 is a cross section of an electrode provided with a metal core. Fig. 2 is a cross section of a modification. Fig. 3 is a cross section of a further modification and a corresponding plan. Fig. 4 is a cross section of another modification and a corresponding plan and Figs. 5 and 6 show further modifications with corresponding plans.

Fig. 1 shows the carbon electrode which is provided with a conical bore. The metal core *b* which has been cast into this is by reason of the end plate *c* firmly pressed against the inner walls of the carbon on solidification.

According to Fig. 2, a metal core *b* is loosely inserted into the carbon electrode *a*. The bore of the carbon electrode in this instance is also conical and between the inner wall of the carbon and the metal core *b* a metal or metal alloy is cast, which on solidification forms a good contact between the hollow body and the core due to its contraction.

In Fig. 3 the metal core *b* is provided of a slight conical form at both ends. After pouring in the cast mass, the metal contracts both in a longitudinal and in a transverse direction. In this manner a high pressure is exerted in the direction of the arrows and the metal shrinks firmly against the wall of the carbon electrode. It is advisable to provide these walls with grooves for the purpose of increasing the contact surface.

In Fig. 4 the metal core is of cylindrical form but its ends are conical and terminate in cylindrical or rectangular portions. Also in this case, an adhesion of the metal core along the conical surfaces as also at the end castings takes place. This arrangement simultaneously operates as the armature for the electrode, as a strong pulling action takes place in the direction of the arrows.

Fig. 5 shows a constructional form in which the metal core is pressed into the hollow space provided in the body of the carbon by mechanical means. The metal core *b* is of slightly conical form and into its end is cast a screw-bolt *e*. After casting, there is inserted in the recess *g*, provided at the other end of the electrode, a strong washer *h* and on this a nut *f*. If, on casting, the core has shrunk, and an air space has been formed between the metal core and the electrode, an intimate contact with the walls of the electrode is effected by a powerful tightening of the nut *f* on the bolt.

Fig. 6 shows the same principle in another arrangement. On the employment of the electrode care must be taken that the conical part of the core in which the bolt is secured is continually directed upward.

By the heat which is produced in the electric furnace the metal core expands more than the carbon, and therefore also during the employment of the electrode a firm pressing and thus also a good contact is effected between the metal core and the electrode.

What I claim as my invention and desire to secure by Letters Patent is:

1. A carbon electrode for electric furnaces consisting of a carbon member having a hole, means for reducing the electrical resistance of the carbon member comprising a metal core in said hole, said metal core extending along the whole length of the electrode and being retained in intimate contact with the carbon member.

2. A carbon electrode for electric furnaces comprising a carbon member, means for reducing the electrical resistance of the carbon member, consisting of a metal core cast and shrunk into the carbon member, said metal core extending along the whole length of the carbon member.

3. A carbon electrode for electric furnaces comprising a carbon member, means for reducing the electrical resistance of the carbon member consisting of a metal core cast and shrunk into the carbon member, said metal core extending along the whole length of the carbon member, and means for retaining the core in said carbon member.

4. A carbon electrode for electric furnaces comprising a carbon member having a hole, means for reducing the electrical resistance of the carbon member consisting of a metal core cast into said hole and extending substantially along the whole length of said carbon member, the hole and the core being of such form that the core on solidification will shrink into said hole and firmly contact with the carbon member.

5. A carbon electrode for electrical purposes comprising a carbon member having a hole, said hole extending along the whole length of the carbon member and being partly conical, means for reducing the electrical resistance of the carbon member consisting of a metal core, cast into the hole and on solidification contracting and firmly contacting with the carbon member.

In testimony whereof I have hereunto signed my name to this specification, in the presence of two subscribing witnesses.

BERTHOLD REDLICH.

Witnesses:
FRANK G. POTTS,
ERNST KATZ.

---

Copies of this patent may be obtained for five cents each, by addressing the "Commissioner of Patents Washington, D. C."